United States Patent [19]

Dykstra

[11] Patent Number: 4,817,577
[45] Date of Patent: Apr. 4, 1989

[54] BREAKERLESS IGNITION SYSTEM WITH ELECTRONIC ADVANCE

[75] Inventor: Richard A. Dykstra, Cedar Grove, Wis.

[73] Assignee: Briggs & Stratton Corporation, Wauwatosa, Wis.

[21] Appl. No.: 157,374

[22] Filed: Feb. 18, 1988

[51] Int. Cl.$^4$ ............................ F02P 5/04; F02P 1/00; F02P 11/00
[52] U.S. Cl. ................................ 123/651; 123/149 C; 123/625; 123/335
[58] Field of Search ............... 123/650, 652, 651, 418, 123/149 A, 149 C, 335

[56] References Cited

U.S. PATENT DOCUMENTS

| | | | |
|---|---|---|---|
| 3,504,373 | 3/1970 | Strelow | 123/149 A |
| 3,938,491 | 2/1976 | Mazza | 123/149 C |
| 4,178,892 | 12/1979 | Podrapsky et al. | 123/149 C |
| 4,233,951 | 11/1980 | Take | 123/625 |
| 4,329,950 | 5/1982 | Orova et al. | 123/149 C |
| 4,361,129 | 11/1982 | Sugic et al. | 123/651 |
| 4,452,199 | 6/1984 | Andreasson | 123/335 |
| 4,501,256 | 2/1985 | Dykstra | 123/651 |
| 4,706,640 | 11/1987 | Andraesson | 123/651 |
| 4,712,521 | 12/1987 | Campen | 123/149 C |

Primary Examiner—Raymond A. Nelli
Attorney, Agent, or Firm—Andrus, Sceales, Starke & Sawall

[57] ABSTRACT

A magneto ignition system includes a rotating magnet driven past a primary winding for firing the engine. The magneto generates a speed dependent signal having a following current pulse and a leading current pulse of a smaller amplitude than the following pulse. A Darlington power transistor has a collector connected in series with a voltage dropping resistor or diode to the winding. A resistor bias circuit connects the primary winding to the input of the power transistor. A cut-off transistor is connected to by-pass the bias circuit of the Darlington power transistor and thereby generate a pulse in the primary winding. A timing capacitor is connected to the primary winding in series with a diode and charging resistor. A control transistor has its input circuit connected between the timing capacitor and the resistors of the bias circuit. The control transistor responds to the differential of the bias circuit voltage and the capacitor voltage, whereby the control transistor drives the cut-off transistor to turn off the power transistor during the decreasing side of the winding circuit after it peaks at starting and low speeds and progressively increases with a gradual advance during the starting speed range, and includes a maximum advance established prior to the peak current value.

27 Claims, 1 Drawing Sheet

BREAKERLESS IGNITION SYSTEM WITH ELECTRONIC ADVANCE

BACKGROUND OF THE PRESENT INVENTION

The present invention relates to a breakerless ignition system with an automatic electronic advance circuit and particularly to such an ignition system in which advance changes over a wide range of speed, between a low speed retard timing and a high speed advance timing.

Ignition systems for internal combustion engines have been developed using solid state technology which eliminates the necessity of mechanical switching devices for establishing the properly timed firing pulse to the internal combustion engine. In the solid state system, a voltage sensitive transistor or other solid state switch responds to the ignition power supply, which is operated in synchronism with the engine. In many relatively small and low horsepower internal combustion engines, a magneto unit is the source of power for the ignition system. The output of the magneto unit is generally a periodic alternating current AC signal generated in synchronism with the engine operation. Thus, as the magnet moves past the winding the signal is generated which includes three half cycles which alternate about zero or reference level. The shape and configuration of the AC signal vary with speed, and in particular, the magnitude and frequency of the AC signal vary with speed. Generally, the leading and trailing portions of each signal have a lower amplitude than the central portion or half cycle. Further, the AC signal is synchronized with the rotation of the engine, such that the time position of the signal is directly related to the position of the piston and the desired firing cycle of the engine.

This phenomena is known and used to provide automatic changes in the angle of firing in the ignition system. Generally, the system is designed to provide a relative retard angle of firing at starting and low speeds. The firing angle advances with speed to provide optimum engine operation. For example, U.S. Pat. No. 3,504,373 which issued Mar. 31, 1970 provides a solid state ignition switch system which has an automatic advance with a firing just before the peak level is obtained. Other solid state ignition systems with various controls are shown in the following U.S. patents:

| U.S. Pat. No. | Issue Date | Inventor |
| --- | --- | --- |
| 3,504,373 | 03/31/1970 | Strelow |
| 3,938,491 | 02/17/1976 | Mazza |
| 4,130,101 | 12/19/1978 | Jundt et al |
| 4,178,892 | 12/18/1979 | Podrapsky |
| 4,233,951 | 11/18/1980 | Take |
| 4,452,199 | 06/05/1984 | Andreasson |

Although various solid state ignition systems have been disclosed, the cost and reliability, particularly with repeatability of system operation, have not been totally satisfactory. This is particularly true for the smaller internal combustion engines where the ignition system module is mounted in a relatively confined space and may be subjected to a wide range of temperatures during normal system operation. The modules are optimumly designed as small and highly compact modules which can be mounted in the system. Because of the wide temperature ranges encountered, the circuit must be typically stabilized to operate with a range of −40 degrees Fahrenheit (°F.) to +200° F. Further, the small engine market is highly competitive and minimizing of cost is a significant factor in producing a satisfactory competitive system.

The range of timing change is peferably from a relatively large angle of retard at starting and low engine speeds to an angle of advance at high normal operating speeds. The timing angle should therefore move from the descending or trailing side of the peak current signal at low engine speeds to the advance or leading side thereof at high engine speeds. Applicant does not know of an ignition system which provides a range beginning in a relatively extreme initial retard portion of the AC ignition signal and at high speed extending beyond the peak to a significant advance position, thereby producing the desirable wide change range of the timing angle.

Further, any system which is designed would necessarily demand a simple, compact construction at a competitive low cost, and producing a consistent, repeatable functioning with changes in speed.

SUMMARY OF THE INVENTION

The present invention is particularly directed to an automatic advancing breakerless ignition system using an AC type signal source to produce a relatively large retard angle during low engine speed and an automatic advance in the timing angle with increasing engine speed, with the advance moving past the peak value of the AC signal at normal engine operating speeds. The circuit is formed of reliable and readily commercially available components to produce an economically packaged compact module, with a high degree of temperature stabilization and consistent, repeatable functioning.

Generally in accordance with the teaching of this invention, the magneto or other similar AC power supply is connected to a primary winding and generates a firing pulse during an appropriate half cycle of the AC supply which is synchronized with the engine operation. The conductive path for the primary winding includes a high gain switching power transistor unit such as a Darlington transistor connected essentially in parallel with the primary winding, and particularly includes a voltage dropping means such as a resistor or diode in the collector circuit of the power transistor. An input bias circuit for the power transistor is also coupled to the primary winding, and the power transistor is biased to conduct, thereby providing a relatively low resistance current path which is stabilized by the special collector voltage dropping means. A solid state control switch such as a control transistor is connected to the bias circuit of the power transistor, and includes a capacitive branch connected in an input circuit of the control switch. The input circuit of the control transistor has one input subject to the capacitor voltage while the opposite side of the control transistor's input is connected to a voltage proportional to the input bias voltage for the high gain power transistor. The capacitor is connected in the input circuit to charge to a level somewhat below the peak level of the supply signal from the synchronized AC power supply. During the charging cycle, the capacitor charges to a maximum value slightly less than the peak signal of the magneto. The capacitor voltage is applied to the control transistor to bias it into conduction. However, the control transistor is held off as the result of the application of bias voltage from the input bias circuit to the opposite side of the control transistor. After the peak voltage level is reached, the capacitor voltage is maintained as the result of a diode or other unidirectional conducting unit. The voltage applied to the opposite side of the control transistor decreases as the AC supply current decreases. At a selected value, the latter voltage drops to a level whereby the differential input signal across the control transistor is such that the control transistor switches on. The control switch immediately develops a by-pass path for the input bias signal of the power transistor which turns off and effectively establishes an instantaneous opening of the charging circuit to the primary winding. The opening of the primary winding charging circuit terminates current flow through the inductor, with a resulting induced high voltage which is coupled through a transformer means to the engine firing unit such as a spark plug. As the speed increases, the differential voltage signal continuously advances and increases to a differential firing level at an earlier period in the signal. The collector impedance of the switching power transistor serves to enhance the ignition circuit operation by increasing the control circuit voltage with increasing current. At normal high speed engine operation, the capacitor voltage charge level and the back bias level reach a differential turn-on signal prior to the peak of the inductor current. Thus, at the advance limit, the circuit establishes ignition prior to the peak current in the inductor charging circuit. This produces a maximum and significant advance firing angle.

More particularly in accordance with one embodiment of the present invention, a Darlington power transistor is connected in series with a collector resistor of a relatively low value or a forward biased diode to stabilize the system of operation. The turn-on signal to the power Darlington includes a pair of series resistors connected between the base of the power Darlington and the high potential side of the primary winding. The control switch for the power transistor may include a high gain cut-off transistor connected between the junction of the input bias resistors and the return or common connection between the Darlington power transistor emitter and the primary winding. A capacitor is connected to one input of the control switch. A diode and charging resistor are connected in series between the capacitor and the top side of the primary winding. The several resistors function to stabilize the system operation and produce a repeatable temperature stable circuit.

In an alternate construction, the control transistor has its emitter coupled to the emitter of the Darlington power transistor with a common emitter biasing resistor connected to the bottom side of the primary winding.

As the primary winding current pulse increases, the capacitor is charged to slightly below the peak voltage level of the input signal, with the capacitor voltage and the bias voltage applied across the input of the control transistor and with the bias voltage back biasing the control transistor. After the pulse peak is reached, the level of the bias voltage decreases. At lower speeds, the capacitor voltage is held at a fixed level while the bias voltage decreases, until the differential voltage appearing across the control transistor triggers and turns on the control transistor thus turning off the power transistor and generating the voltage pulse across the primary winding for firing the engine.

The control switch in one practical circuit consists of a regenerative circuit including a PNP control transistor having its emitter connected to the capacitor and its base connected to the bias circuit resistors of the power Darlington transistor. An NPN cut-off transistor has its base connected to the collector of the PNP transistor and its collector-to-emitter circuit connected between the connection of a Darlington bias circuit and the common line. A resistor advantageously may also be connected across the base-to-emitter circuit of the NPN transistor.

In the alternate circuit construction with the common emitter resistor, a single control transistor is used with the collector and emitter connected, respectively, to the junction of series connected bias resistors of the Darlington power transistor and the emitter side of the common emitter resistor. The base of the control transistor is connected directly in series with a resistor to the junction of the capacitor and the charging resistor. The charging circuit preferably also includes a Zener diode. The common emitter circuit has a slightly smaller cranking retard firing-angle but typically provides a flatter temperature compensation characteristic.

Thus, with the cascaded transistor control switch circuit, the output may vary with a range of approximately 15% over the operating temperature of 0° F. to plus 175° F. The cut-in speed of the circuit varies by approximately 65 rpm. In contrast, the common emitter circuit has an output variation of only approximately 4% during the same temperature range and the cut-in speed varies by a minimal 25 rpm. The cascaded transistor circuit provides a somewhat greater ignition retard, generally on the order of an additional two degrees. Generally, the lesser cost and simplicity of the circuit using the common emitter circuit design, particularly when combined with similar engine operation over the complete temperature range, provides an economical and commercially acceptable ignition system.

In still another alternate embodiment, a full wave bridge rectifier including diode elements or other unidirectional conducting elements connects the primary winding of the magneto unit to the power transistor unit. At least one of the diode elements is connected in series with the collector in place of the collector resistor to similarly introduce a voltage drop into the circuit. A coupling resistor is connected between the primary winding and the cut-off or control circuit and the input bias circuit of the power transistor unit. A coupling diode or the like element by-passes the coupling resistor during the negative half cycle and supplies current to the control circuit. The resistor isolates the control circuit from the primary winding and rectifier output during the negative half cycle. This embodiment functions in the same essential sequence as the previous embodiments but over a wider angle of rotation of the engine. Thus, in the modified circuit current flow through the primary winding is applied to the control circuit to extend the effective range of control. With this circuit configuration, a step function can be introduced into the timing characteristic as the speed increases.

The present invention provides a relatively simple electronic ignition circuit having an automatic advance over a significantly increased range of engine operation between cranking and low speed up to and including normal operating speeds. The circuit includes standard components which are readily commercially available and which reliably operate in the environment of lawn and garden equipment, industrial equipment, marine outboard motors and the like.

BRIEF DESCRIPTION OF THE DRAWINGS

The drawings furnished herewith illustrate the best mode presently contemplated by the inventor for carrying out the invention.

In the drawings.

DESCRIPTION OF THE ILLUSTRATED EMBODIMENT

Figure 1:
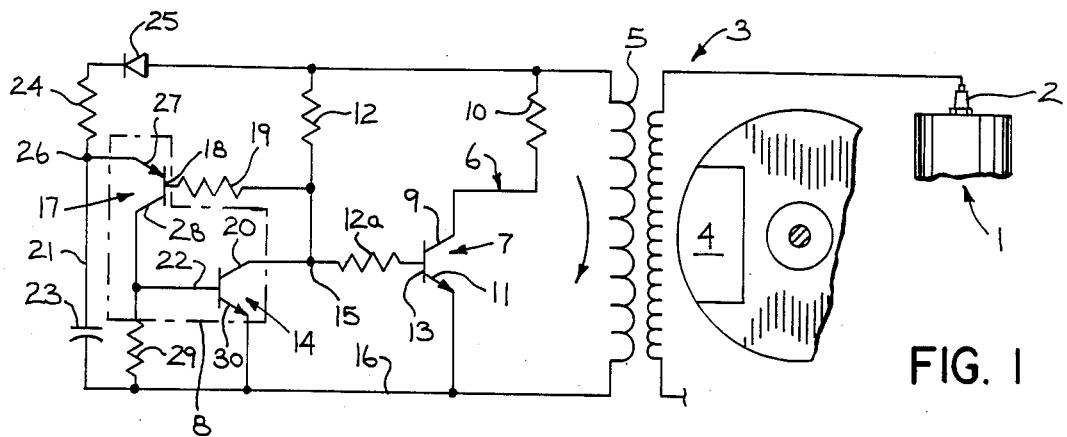
FIG. 1 is a schematic diagram illustrating an automatic electronic advance circuit for a magneto driven ignition system of an internal combustion engine.

Referring to the drawing and particularly to FIG. 1, the internal combustion engine 1 is diagrammatically illustrated having a single spark plug 2. Firing power for spark plug 2 is derived from a magneto unit or generator 3 having a rotating magnet 4 coupled to and driven in synchronism with engine 1, and particularly the position of the engine piston (not shown). The magneto generator 3 includes an inductive primary winding 5 coupled to the rotating magnet 4. Rotation of the magnet 4 past winding 5 generates a magnetic flux through winding 5 which in turn creates a current flow in winding 5 and an associated branch circuit 6. connected directly across winding 5. A power switching transistor 7 in branch circuit 6 is biased by the signal from winding 5 to conduct current through winding 5 and thereby inductively charge winding 5. A control switch unit 8 is operable conjointly with branch circuit 6 to turn off the power switching transistor 7 essentially instantaneously. As is well known, opening the circuit of a current in a highly inductive circuit results in generation of a voltage pulse across inductor winding 5. By transformer action, the voltage pulse is amplified and applied to spark plug 2 at the appropriate time in the engine cycle to ignite the fuel and power the engine, and thereby establish and maintain operation of the internal combustion engine. The magnet 4 rotates with the engine, and the coupling thereof with winding 5 is timed to coincide with the time in the engine cycle that the piston is in the optimum position for firing, in accordance with conventional construction of such engines. The firing point or time changes with engine speed for optimum firing.

The internal combustion engine and the magneto unit as such may be of any known or desired construction. Such engines are readily available and the specifications and constructions are well known. The present invention is particularly directed to the ignition circuit including the charging circuit and the firing control circuit to produce an automatic timing and optimize the creation of the firing pulse to the engine. Consequently, the engine and the magneto are only described in such detail as necessary to clearly explain and set forth the functioning and operation of the novel and unique ignition circuit.

The power switching transistor 7 connected in branch circuit 6 is a high gain, rapid acting switch, and preferably is a temperature stablized Darlington transistor unit. Darlington transistors are readily commercially available from various manufacturers including Motorola of Ill., NEC of Japan and others. The Darlington power transistor 7 is schematically illustrated as an NPN transistor configuration connected across inductor winding 5. Transistor 7 has its collector 9 connected to the one side of winding 5 in series with a special stabilizing resistor 10. Emitter 11 of transistor 7 is shown connected directly to the opposite or common end of winding 5. A pair of bias resistors 12 and 12a are connected in series between the high potential side of winding 5 and base 13 of transistor 7. As magnet 4 moves past winding 5, it generates an increasing alternating current signal in winding 5. The frequency and amplitude of the AC signal are of course directly proportional to the rotational speed of magnet 4. The AC signal is therefore also position-related to the engine cycle and particularly the cyclical movement of the piston (not shown). The AC signal therefore also provides a reference signal for firing of the internal combustion engine, as well as the power to fire the engine.

Control switch unit 8 is coupled to inductor winding 5 and is driven therefrom to control the ignition, with a variable timing for optimum engine operation. Control switch unit 8 is shown as a cascaded transistor circuit including a first cut-off transistor 14, and a second control transistor 17. Cut-off transistor 14 is shown as an NPN transistor having its collector 20 connected to the junction or node 15 of resistors 12 and 12a and thereby to base 13 of power transistor 7 and its emitter 30 connected to a common return line 16. When cut-off transistor 14 is turned on it effectively grounds base 13 of power transistor 7 and drives transistor 7 off. Cut-off transistor 14 is driven by a control transistor 17, the output of which is connected in series with the input of cut-off transistor 14. Control transistor 17 is shown as a PNP unit and is particularly connected into the circuit to respond to the current signal in winding 5 so as to provide an automatic advance in the timing over a wide timing range as the engine speed varies from a low or cranking speed to a maximum operating speed.

In particular, control transistor 17 is shown as a PNP transistor connected in circuit with the inductor winding 5 to control the particular point in the engine cycle at which conduction in winding 5 is terminated so as to create the timing pulse. Base 18 of transistor 17 is connected in series with a resistor 19 to the common junction or node 15 of bias resistors 12 and 12a and to collector 20 of cut-off transistor 14. The emitter-to-collector of transistor 17 is connected between a timing branch 21 and base 22 of transistor 14. The input of transistor 17 is connected between timing branch 21 and the base circuit of power transistor 7.

Branch 21 includes a capacitor 23 connected in series with a charging resistor 24 and a blocking diode 25 directly across the circuit of the inductor winding 5. Diode 25 is polarized to conduct from the high side of winding 5 to the common line 16. A common node 26 between the top side of capacitor 23 and charging resistor 24 is connected to emitter 27 of control transistor 17. Collector 28 of control transistor 17 is connected to base 22 of cut-off transistor 14 and via a resistor 29 to line 16.

Transistor 14 is an NPN transistor that has its emitter 30 connected to line 16 to by-pass the signal from node 15 and thereby from the base of transistor 7 when transistor 14 conducts. When control transistor 17 conducts, it provides current to base 22 of cut-off transistor 14 which conducts to turn off power transistor 7 and thereby generate the firing pulse to spark plug 2.

The charging of the capacitor 23 and the time of transistor cut-off is related to the shape of the magneto signal, which is generally an alternating current signal.

Figure 2:
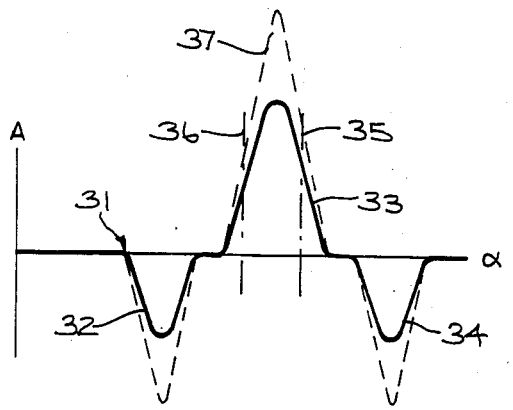
FIG. 2 is a diagrammatic illustration of a magneto output signal, with the vertical axis representing signal amplitude and the horizontal axis representing rotation angle.

A typical magneto signal 31 is shown in solid line diagrammatically illustrated in FIG. 2. The signal 31 includes a small amplitude leading negative half cycle or pulse 32, a large amplitude positive half cycle or pulse 33 and a trailing negative half cycle or pulse 34. In the circuit of FIG. 1 the negative pulses 32 and 34 are blocked by diode 25 and therefore are inoperative as related to the timing control circuitry. The charging and firing cycle is therefore initiated at the zero reference of positive pulse 33, and the timing and piston position shown on the horizontal axis. The desired ignition at low cranking speed is shown by the vertical line 35 to the right side of the positive pulse 33. This is a highly retarded firing time or angle with the ignition occuring well after peak current. Highly retard timing is desired during the engine cranking and low speed operation. However, as the speed increases, the firing should advance and at maximum speed should be slightly in advance of the peak current period or time such as shown by a vertical line 36 to the left side of pulse 37 in FIG. 2. The illustrated circuit of FIG. 1 with the control voltage applied to control switch unit 8, provides the desired characteristic as follows.

As the primary winding voltage is increasing with the upper end of the illustrated winding positive, bias current is supplied through the base resistors 12 and 12a to base 13 of the base-emitter junction of Darlington power transistor 7. Current flow through the base emitter junction turns on power transistor 7 and establishes a significant current flow through the primary winding 5.

Control transistor 17 has its emitter 27 connected to the positive voltage side of the circuit shown in FIG. 1 through diode 25 and charging resistor 24. Base 18 of transistor 17 however is also connected to the corresponding positive voltage side through resistor 12. The voltage at base 18 is initially greater than that applied to emitter 27 as a result of the discharged capacitor 23, so the transistor 17 is off. This in turn holds cut-off transistor 14 off and the power Darlington transistor 7 continues to conduct charging current through winding 5.

At low engine speeds, the voltage drops across diode 25 and resistor 24 holds emitter 27 of the PNP control transistor 17 at a voltage relative to the voltage at base 18 well below the turn-on voltage.

As the primary winding waveform increases, capacitor 23 is charged by current flow from winding 5. Capacitor 23 charges through its charging resistor 24 to a voltage slightly less than the peak voltage, and in particular to the peak voltage less the voltage drop across diode 25. Thus, capacitor 23 charges to a voltage slightly less than the peak voltage established across the primary circuit during the charging current flow through primary winding 5. When the current pulse in primary winding 5 reaches its peak level, capacitor 23 is charged to its maximum level. As the primary current decreases, blocking diode 25 maintains the voltage of capacitor 23 at approximately its previously charged level. Further, as the primary current decreases, the voltage appearing at base 18 of transistor 17 also correspondingly decreases and continues to decrease. The voltage across capacitor 23 which remains at its constant value, is applied to emitter 27. At a selected time, the base voltage of transistor 17 drops below the level of the capacitor voltage and the drop across the emitter-to-base junction of transistor 17. At that instant, the emitter-to-base junction is forward biased and current flows through the emitter-to-base circuit, turning on control transistor 17.

Control transistor 17 is thus specially constructed and connected in circuit to respond to a differential voltage dependent on the charging current and, in particular at low engine speeds, responds to the voltage differential created by the current during the descending portion of the charging current.

When transistor 17 turns on, it rapidly drives transistor 14 into a conductive state. With transistor 14 conducting, the voltage at base 13 of power transistor 7 is clamped to the collector-to-emitter voltage of transistor 14, which voltage is significantly less than that required to sustain conduction of the Darlington power transistor 7 and as a result transistor 7 rapidly terminates conduction. The current flow in primary winding 5 is suddenly interrupted. In accordance with known phenomena, a high voltage pulse is created within primary winding 5, which by transformer action is increased in level to apply an exceedingly high secondary winding voltage to spark plug 2 for firing of engine 1.

As the engine speed increases above the cut-in speed of the system the positive pulse 33 increases in amplitude such as represented by dashed line 37 in FIG. 2. The voltage of capacitor 23 becomes sufficiently high at an earlier time in the current cycle to overcome the back bias at base 18 of transistor 17 and thereby provides a progressively earlier turn-on of transistors 17 and 14, causing a corresponding earlier turn-off of Darlington power transistor 7. The turn-off time increases progressively during the current pulse and produces a gradual advance of the ignition timing from engine starting or cranking speeds through acceleration to the normal operating speed range.

The circuit has been found to provide a cost effective automatic advance circuit with a wide range of advance from a highly retarded firing angle to the significantly advanced timing position on the ascending side of the charging current.

The circuit is stable and is affected very little by normal temperature variations. Collector resistor 10 in the circuit of power Darlington transistor 7 is of a low-value resistance but is a highly significant addition to the circuit, which creates an increased voltage across the control circuitry. A typical value of resistance for resistor 10 is 1.0 ohm. The added resistance of resistor 10 has been found to significantly enhance the overall circuit operation.

Base resistor 19 connected in the circuit of control resistor 17 maintains a relatively long spark duration with different ignition coils. The Darlington base resistor 12a minimizes reverse current flow through cut-off transistor 14 during the opposite or negative portion of the primary winding waveform. The cut-off transistor's base resistor 29 reduces the negative effects of the capacitance of transistor 14 and stray capacitance in the system and thus further improves the overall circuit performance. Although resistors 12a, 19 and 29 may be eliminated to simplify the circuit, improved performance is obtained by the use thereof.

Figure 3:
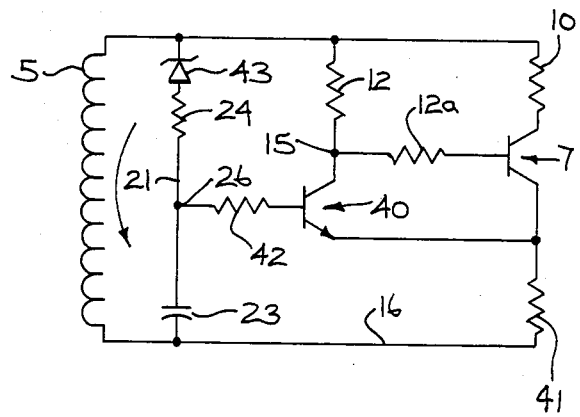
FIG. 3 is a schematic circuit illustrating a modification to the circuit of FIG. 1.

A modification of the circuit shown in FIG. 1 is shown in FIG. 3. In the embodiment of FIG. 3, a single control transistor 40 replaces the two transistors 14 and 17 of the first embodiment.

Control transistor 40 is connected in a common emitter configuration with the Darlington power transistor 7. A common emitter resistor 41 connects the common emitter connection of transistors 40 and 7 to the reference side or line 16 of the circuit. Thus, the emitters are held at some voltage corresponding to the positive pulse 33 or 37. This voltage is positive relative to line 16 and tends to back bias transistor 40. The collector of transistor 40 is connected to common node 15 of the input bias resistors 12 and 12a for the power transistor 7. The base of transistor 40 is connected via a resistor 42 to the timing control branch 21.

In this second embodiment diode 25 is shown replaced by a Zener diode 43 connected in series with charging resistor 24 and capacitor 23. The common node 26 of branch 21 is connected via resistor 42 to the base of control transistor 40.

The circuit of FIG. 3 operates essentially the same as that of FIG. 1. When the primary voltage is of the proper polarity, that is, with the top side of winding 5 positive in FIG. 3, turn-on current flows through resistors 12 and 12a, the base-to-emitter junction of Darlington power transistor 7 and the common emitter resistor 41. The Darlington power transistor 7 conducts, with significant current flow established through transistor 7 and primary winding 5. Control transistor 40 is not conducting because the voltage at the base of control transistor 40 is insufficient to overcome the back bias of the emitter voltage, at low engine speeds. After the primary winding voltage rises to the break over level of Zener diode 43, capacitor 23 charges through charging resistor 24 and the conducting Zener diode 43 to essentially the peak voltage less one Zener diode voltage drop. The current in primary winding 5 reaches the peak value and then decreases. The voltage across emitter resistor 41 and therefore at the common emitter connection at the emitter of power transistor 7 decreases and at a selected level drops below the level which added to the base-emitter voltage of transistor 40 is less than the voltage of capacitor 23. The base-to-emitter junction of transistor 40 is now forward biased and switches to the conductive state. When transistor 40 conducts, transistor 40 by-passes the base current from the base of power transistor 7. Thus, the collector-to-emitter junction of the conducting transistor 40 rapidly clamps the base-to-emitter voltage of power transistor 7 and transistor 7 ceases to conduct.

As in FIG. 1, when transistor 7 ceases to conduct, a high voltage is induced in the primary winding 5, which is transformed to a firing voltage supplied to spark plug 2.

Again as the speed increases, the firing point advances to an earlier point in the charging cycle thereby providing the desired gradual advance in the ignition system.

Figure 4:
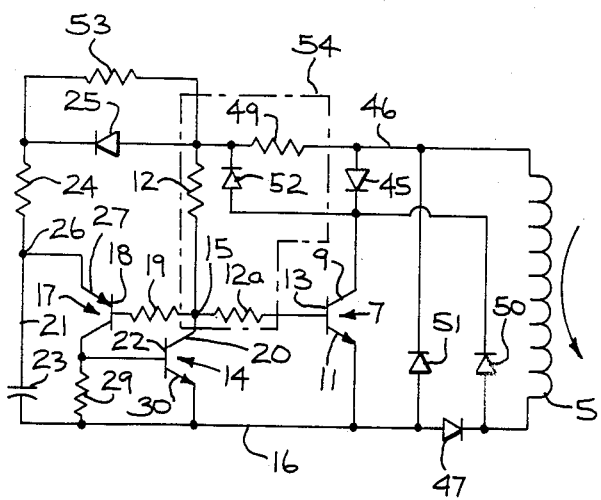
FIG. 4 is a schematic circuit illustrating a third embodiment of the present invention.

A further alternate embodiment of the invention utilizing the negative half cycle or pulse as well as the positive half cycle of the magneto output is illustrated in FIG. 4.

In the embodiment of FIG. 4, the control switch unit 8 essentially corresponds to that of the embodiment of FIG. 1, and thus corresponding elements are correspondingly numbered for simplicity and clarity of explanation.

The main or firing circuit of FIG. 4 includes Darlington power transistor 7 connected across the primary winding of magneto 3 and selectively energized and deenergized by the control switch unit 8 to produce firing of the engine. In FIG. 4, the Darlington power transistor 7 and the control switch unit 8 are connected to primary winding 5 through a full wave diode rectifying circuit as hereinafter described. A forward bias diode 45 replaces the enhancement resistor 10 of FIGS. 1 and 3 and is connected in series with collector 9 of Darlington power transistor 7. Diode 45 introduces a voltage drop in the collector circuit to increase the voltage, and thereby enhance system operation generally as in the prior embodiments.

More particularly, diode 45 is connected between the collector 9 and the common positive side or line 46 of primary winding 5 and is forward biased by the positive half cycle of the primary winding waveform. A return diode 47 is connected between the emitter or the opposite side of power transistor 7 in common line 16 and forms the return leg of one half of a full wave bridge rectifier circuit.

In the circuit of FIG. 4, a power transistor bias circuit 54 includes a resistor 49 connected in the common positive line 46 between primary winding 5 and input bias resistor 12 of the Darlington power transistor 7. With the top side of the primary winding positive, current flows through resistor 49 and input resistors 12 and 12a, which are also part of bias circuit 54, to the Darlington power transistor 7 which is forward biased and conducts. Current flow rapidly increases through the bridge circuit including collector diode 45, power transistor 7 and return diode 47 to primary winding 5. The current through the primary winding 5 stores inductive energy in winding 5. The output of primary winding 5 also supplies charging current to timing capacitor 23 of control switch unit 8, as in the embodiment of FIG. 1.

However, in the embodiment of FIG. 4, the leading negative half cycle or pulse 32 also conducts current through the full wave bridge rectifier as follows. A diode 50 is connected between the negative or bottom side of winding 5 and directly to collector 9 of power transistor 7. A second diode 51 has its anode connected to the common return line 16, and particularly in common with the emitter of power transistor 7 and the anode of diode 47. The cathode of diode 51 is connected to the positive line 46 of primary winding 5. This forms the other half of the rectifying circuit and provides a path for the negative current pulse 32. The current flows from the bottom or negative side of the illustrated primary winding 5 through diode 50, Darlington power transistor 7 and return diode 51 to the top side of primary winding 5.

The negative current pulse is simultaneously supplied to the biasing circuit 54 of power transistor 7 and to switch unit 8 as follows. A diode 52 is connected between collector 9 and the bias circuit side of the resistor 49 in line 46. Current flow from diode 50 is also supplied to the control switch unit 8 to provide charging current to capacitor 23 during the negative half cycle or pulse 32 of the magneto current waveform.

During the negative pulse 32 of the waveform resistor 49 in positive line 46 from primary winding 5 isolates and separates the input bias circuit 54 of the Darlington power transistor 7 and the control switch unit 8 from the top side of primary winding 5.

The control switch unit 8 of FIG. 4 essentially corresponds to that of the previously described embodiment of FIG. 1. A shunting resistor 53 is preferably connected in parallel with charging diode 25. The resistor voltage drop is less than the drop across charging diode 25 at low engine speeds. Resistor 53 therefore reduces the voltage drop at the cut-in speed for positive pulse 33 and negative pulse 32. It should also be noted that resistor 53 could also be connected in parallel relation across diode 25 in FIG. 1 if desired to enhance system operation of the circuit of FIG. 1.

To more fully understand the operation of the modified circuit, reference is made to the characteristic of the output of the magneto waveform presented in FIG. 2. As previously discussed the magneto is constructed to establish the relatively large positive pulse 33 with respect to the described circuit as the magneto magnet passes the primary winding. The lower amplitude leading and trailing negative pulses 32, 34 are generated at opposite sides of the positive pulse 33 as a result of the movement of the magnet 4 into engagement and from engagement with the magneto coil assembly. At low speeds, the energy provided by negative pulses 32 and 34 are minimal and do not affect the functioning of the circuit. The circuit of FIG. 4 at low speeds therefor functions essentially in the same manner as the previous embodiments.

Thus, collector diode 45 which is forward biased during the positive pulse introduces a voltage drop in the collector circuit which functions essentially in the same manner as the collector resistor 10 of the previous embodiments to increase the voltage across the circuit and thereby enhance system operation at low engine speeds.

As in the previous embodiments, the ignition system operates with the firing at a significant retard angle at the lowest speeds; that is, on the down or decreasing side of the positive current pulse 33. As the speed increases and the signal increases in amplitude as at 37, the charging of capacitor 23 increases with time and the firing point moves upwardly and prior to the peak of the positive pulse.

As the speed continues to increase, the negative pulses 32 and 34 also increase in amplitude. The energy provided from the negative pulses thus becomes significant and becomes sufficiently high to actuate the control. The negative current pulse is thus also supplied to resistors 12 and 12a of the turn-on bias circuit 54 via diodes 50, 51 and 52, and thereby to the input of Darlington power transistor 7. During the negative pulses, charging current is also supplied to charge capacitor 23 in a significant level. Capacitor 23 is now charged to a level permitting firing of control transistor 17. Power transistor 7 is then turned off by the conducting cutoff transistor 14 and a firing pulse is created. The firing pulse is of course of an opposite polarity compared to that created by the positive half-cycle 33. During the following positive pulse 33, the circuit may recycle to continue the firing as capacitor 23 rapidly charges. The timing will progressively increase with speed during the period of the negative pulse.

Various modes of carrying out the invention are contemplated as being within the scope of the following claims particularly pointing out and distinctly claiming the subject matter which is regarded as the invention.

I claim:

1. A breakerless ignition system for an internal combustion engine, comprising a generator having a rotating magnet means periodically coupled to a primary winding and generating an alternating current output including a leading pulse signal and a following pulse signal of opposite polarity interconnected to form a periodic output signal and operable to generate a firing voltage pulse upon interruption of said output signal, a switching power transistor means having a collector and an emitter and an input base, a control switch means connected to said input base to turn said power transistor means off, a voltage dropping means connected in series with said collector to enhance system operation at low engine speeds, and a full wave bridge rectifier with diode elements connected between said primary winding and said collector-to-emitter of said power transistor means, said voltage dropping means being one of said diode elements connected in series with the said collector and introducing said voltage drop into said circuit.

2. The ignition system of claim 1 further including a capacitor connected to be charged by the output of said primary winding, and wherein said control switch means includes a cut-off transistor connected to the primary winding and having an output circuit connected to by-pass an input bias circuit for said power transistor means and having an input circuit connected between said capacitor and said input bias circuit whereby said control switch means is biased on by the difference between the signal from the bias circuit and the charge on said capacitor.

3. The ignition system of claim 1 wherein said control switch means includes a control transistor having a voltage sensitive input means and a biasing capacitor connected to the input means, said bridge rectifier including a first diode as said voltage dropping means, a second return diode element connecting the emitter and the primary winding to conduct said following pulse signal, third and fourth diodes connected one each to the opposite ends of the primary winding and to the collector and emitter to conduct said leading pulse signal, a bias circuit including a coupling resistor connecting said first diode element and said primary winding to said power transistor means to bias said transistor means on and to said control switch means to charge said capacitor and bias said control switch means on by the difference between the capacitor voltage and bias circuit voltage, and a fifth diode element connected across said coupling resistor and said first diode element to conduct said leading pulse signal to said control switch means and said bias circuit.

4. The ignition system of claim 3 wherein said bias circuit further includes a voltage dividing resistor means connected between said coupling resistor and said power transistor to bias said power transistor on, and the input of said control transistor being connected to said voltage dividing means and said capacitor.

5. The ignition system of claim 3 including a charging diode and a charging resistor connected in series between said coupling resistor and said capacitor to conduct said leading and following pulse signals, and a shunting resistor connected in parallel with said charging diode.

6. The ignition system of claim 2 wherein said control switch means further includes a control transistor having an input circuit connected between said capacitor and said input bias circuit and an output circuit connected to the input circuit of said cut-off transistor, a resistive charging circuit connected between said primary winding and the capacitor whereby said capacitor is charged from the primary winding through a charging diode, the difference in voltage on said capacitor and the voltage at the input bias circuit is applied to the input of said control transistor whereby the control switch means is biased on and establishes cut-off of said power transistor and creation of a firing pulse signal, said firing pulse signal being created during the period of the primary winding current decreases subsequent to reaching of its peak of value at starting and low speeds and progressively increases with a gradual advance in the ignition system firing throughout the engine starting speed range and includes a maximum advance established prior to the peak current value.

7. The ignition system of claim 6 wherein said control transistor has an emitter connected to said capacitor and a base connected to said input bias circuit of said power transistor, and said cut-off transistor output circuit is a collector-to-emitter circuit, said cut-off transistor having a base connected to the output of said control transistor.

8. A breakerless ignition system providing a progressive advance in ignition timing for an internal combustion engine and having a generator operated in synchronism with the engine for generating current pulses in a winding, comprising an ignition circuit having first and second power input terminals for connection to the opposite sides of said winding, a charging branch circuit connected to said input terminals and including a power switching transistor means having a collector and an emitter and a base, said branch circuit including a collector voltage dropping means connected between the collector and the connection to said input terminals to increase the system voltage across said charging branch circuit, an input bias circuit including at least first and second resistors connected in series between said power switching transistor and said input terminals, said emitter being connected to said second terminal, a control switch means connected between said bias circuit and said second terminal and operable to turn off said power transistor means, said control switch means having first and second input bias terminals, a capacitive control circuit connected to said input power terminals and including a diode means connected in series with a charging resistor and a capacitor, said capacitor being connected to said first input bias terminal of said control switch means, resistor means connecting said second input bias-terminal of said control switch means to said input bias circuit of said power transistor means with the voltage on the transistor decreasing subsequent to the peak of the current whereby the level of the input bias circuit voltage progressively decreases and said capacitor voltage turns on said control switch means at a time dependent upon the output of the generator and functioning to terminate conduction of said power transistor means and thereby interrupting current flow through said winding with a progressing advance in timing with increasing engine speed, said current interruption generating a high pulse voltage adapted to fire said internal combustion engine.

9. The ignition system of claim 8 wherein said power switching transistor is a Darlington transistor of an NPN configuration.

10. The ignition system of claim 8 wherein said voltage dropping means is resistor means.

11. The ignition system of claim 8 wherein a full wave bridge rectifier includes a plurality of diodes to said first and second power terminal means and said voltage dropping means is one of said diodes.

12. The ignition system of claim 8 wherein said control switch means and said power switching transistor have emitters connected to each other, and a common emitter resistor connected between said emitters and said primary winding.

13. The ignition system of claim 8 wherein said control switch means includes a first cut-off transistor having a collector-to-emitter circuit connected between the junction of said first and second resistors of said power transistor input bias circuit and reference to turn off said power transistor, a second control transistor having an emitter connected to the capacitor and a base, said resistor means connects said base to the junction of the first and second resistors of the power transistor input bias circuit, said control transistor includes a collector connected to the base of the cut-off transistor.

14. The ignition system of claim 13 including a third resistor with one side connected to the collector of the control transistor and the base of the cut-off transistor, and a second side connected to the emitter of the cut-off transistor.

15. A magneto ignition system, comprising a magneto having a primary winding and a rotating magnet coupled to said primary winding, said magneto having an input means for coupling to an internal combustion engine and operating to move past said primary winding for firing of each cylinder of the engine, a power transistor switch having a collector and an emitter and an input base, a diode connected in series with said collector to the positive side of said primary winding, said magneto generating an alternating signal in said primary winding including a following current pulse and a leading pulse, said leading pulse having somewhat lower amplitude than said following pulse at the operating speeds of the engine, both of said pulses increasing in amplitude and frequency with speed, a second diode connected in series with said emitter to one side of said primary winding to provide rectified current flow from the primary winding through said power transistor switch, a third diode connected between one side of said primary winding and said collector, a fourth diode connected to the emitter and to the other side of said primary winding to establish current flow through said primary winding and said third diode through said power transistor switch, a coupling resistor connected between said other side of said primary winding and the input bias circuit of said power transistor switch, to supply a turn-on signal to said power transistor switch during the following half cycle of said magneto output, a diode connected between the collector of said power transistor switch and said bias circuit to provide turn-on current to said power transistor switch during the leading half cycle of said magneto output, a control switch means connected to the input bias circuit and operable to bypass said input bias circuit to terminate conduction of said power transistor switch, said control switch means having means connecting a timing capacitor to said input bias circuit, said control switch means having a first input element connected to said timing capacitor and a second input element connected to said input bias circuit whereby the turn on of said control switch means is determined by the relative voltage output of said input bias circuit and said capacitor voltage, whereby said control switch means is biased on and establishes cutoff of said power transistor with creation of a firing pulse signal, said firing pulse signal being created during the period the primary winding current decreases after reaching its peak value at starting and low speeds and progressively increasing with a gradual advance in the ignition system firing throughout the engine starting speed range and includes a maximum advance established prior to the peak current value.

16. The magneto ignition system of claim 15 wherein said input bias circuit includes at least two series-connected bias resistors and said control switch means includes a first cut-off transistor means having collector-to-emitter circuit connected between the junction of said bias resistors of said input bias circuit and reference to turn-off said power transistor, a second control transistor having an emitter connected to the capacitor and having a base, a resistor connecting said base to the junction of the bias resistors of the input bias circuit, and said control transistor having a collector connected to the base of the cut-off transistor.

17. The magneto ignition system of claim 16 having a resistor with one side connected to the collector of the control transistor and the base of the cut-off transistor, and a second side connected to the emitter of the cut-off transistor.

18. The magneto ignition system of claim 16 including a charging diode in series with a charging resistor connected between said primary winding and the capacitor, whereby said capacitor is charged from said primary winding, a shunting resistor connected in parallel with said charging diode whereby said capacitor is charged from said primary winding, the control transistor being biased on in accordance with the difference in voltage between said capacitor and the junction of said resistors of said input bias circuit.

19. A breakerless ignition system providing a progressive advance in ignition timing for an internal combustion engine and having a generator operated in synchronism with the engine for generating current pulses in a winding, comprising an ignition circuit having first and second power input terminals for connection to the opposite sides of said winding, a charging branch circuit connected to said input terminals and including a power switching transistor means having a collector and an emitter and a base, said branch circuit including a collector voltage dropping means connected between the collector and the connection to said input terminals to increase the system voltage across said charging branch circuit, an input bias circuit including at least one resistor connected between said power switching transistor and said input terminals, said emitter being connected to said second terminal, a control switch means connected between said bias circuit and said second terminal and operable to turn off said power transistor means, said control switch means having first and second input bias terminals, a capacitive control circuit connected to said input power terminals and including a diode means connected in series with a charging resistor and a capacitor, said capacitor being connected to said first input bias terminal of said control switch means, said second input bias-terminal of said control switch means connected to the input bias circuit of said power transistor means with the voltage on the transistor decreasing subsequent to the peak of the current whereby the level of the input bias circuit voltage progressively decreases and said capacitor voltage turns on said control switch means at a time dependent upon the output of the generator and functioning to terminate conduction of said power transistor means and thereby interrupting current flow through said winding with a progressing advance in timing with increasing engine speed, said current interruption generating a high pulse voltage adapted to fire said internal combustion engine.

20. The ignition system of claim 19 wherein said power switching transistor is a Darlington transistor of an NPN configuration.

21. The ignition system of claim 19 wherein said voltage dropping means is resistor means.

22. The ignition system of claim 19 wherein a full wave bridge rectifier includes a plurality of diodes to said first and second power terminal means and said voltage dropping means is one of said diodes.

23. The ignition system of claim 19 wherein said control switch means and said power switching transistor have emitters connected to each other, and a common emitter resistor connected between said emitters and said primary winding.

24. The ignition system of claim 19 wherein said control switch means includes a first cut-off transistor having a collector-to-emitter circuit connected between the junction of said first and second resistors of said power transistor input bias circuit and reference to turn off said power transistor, a second control transistor having an emitter connected to the capacitor and a base, said resistor means connects said base to the junction of the first and second resistors of the power transistor input bias circuit, said control transistor includes a collector connected to the base of the cut-off transistor.

25. The ignition system of claim 24 including a third resistor with one side connected to the collector of the control transistor and the base of the cut-off transistor, and a second side connected to the emitter of the cut-off transistor.

26. The ignition system of claim 19 further including a resistor located between said second input biasterminal of said control switch means and said input bias circuit of said power transistor means.

27. The ignition system of claim 19 wherein said at least one resistor connected between said power switching transistor and said input terminals comprises first and second resistors connected in series therebetween.

* * * * *

UNITED STATES PATENT AND TRADEMARK OFFICE
CERTIFICATE OF CORRECTION

PATENT NO. : 4,817,577

DATED : April 4, 1989

INVENTOR(S) : RICHARD A. DYKSTRA

It is certified that error appears in the above-identified patent and that said Letters Patent is hereby corrected as shown below:

Claim 26, Col. 16, Line 48, after "input" delete "biasterminal" and substitute therefor -- bias-terminal --.

Signed and Sealed this

Sixth Day of November, 1990

Attest:

HARRY F. MANBECK, JR.

Attesting Officer

Commissioner of Patents and Trademarks